(12) United States Patent
Blok et al.

(10) Patent No.: US 12,281,228 B2
(45) Date of Patent: Apr. 22, 2025

(54) PROPYLENE ETHYLENE DIENE TERPOLYMER POLYOLEFIN ADDITIVES FOR IMPROVED TIRE TREAD PERFORMANCE

(71) Applicant: ExxonMobil Chemical Patents Inc., Baytown, TX (US)

(72) Inventors: Edward J. Blok, Huffman, TX (US); Anthony J. Dias, Houston, TX (US); Jason A. Mann, Houston, TX (US); Andy H. Tsou, Houston, TX (US); Paul T. Q. Nguyen, League City, TX (US); Gabor Kiss, Hampton, NJ (US); Abdul M. Jangda, Humble, TX (US)

(73) Assignee: ExxonMobil Engineering & Technology Company, Baytown, TX (US)

( * ) Notice: Subject to any disclaimer, the term of this patent is extended or adjusted under 35 U.S.C. 154(b) by 756 days.

(21) Appl. No.: 17/056,216

(22) PCT Filed: May 23, 2019

(86) PCT No.: PCT/US2019/033647
§ 371 (c)(1),
(2) Date: Nov. 17, 2020

(87) PCT Pub. No.: WO2019/226843
PCT Pub. Date: Nov. 28, 2019

(65) Prior Publication Data
US 2021/0230403 A1 Jul. 29, 2021

Related U.S. Application Data

(60) Provisional application No. 62/675,795, filed on May 24, 2018.

(30) Foreign Application Priority Data

Jun. 12, 2018 (EP) .................................... 18177410

(51) Int. Cl.
*C08L 9/06* (2006.01)
*B60C 1/00* (2006.01)
*B60C 11/00* (2006.01)
*C08L 23/16* (2006.01)

(52) U.S. Cl.
CPC .............. *C08L 9/06* (2013.01); *B60C 1/0016* (2013.01); *B60C 11/0008* (2013.01); *C08L 23/16* (2013.01); *B60C 2011/0025* (2013.01); *C08L 2205/03* (2013.01)

(58) Field of Classification Search
CPC ........ C08L 9/06; C08L 23/16; C08L 2205/03; B60C 1/0016; B60C 11/0008; B60C 2011/0025
See application file for complete search history.

(56) References Cited

U.S. PATENT DOCUMENTS

| | | |
|---|---|---|
| 3,873,489 A | 3/1975 | Thurn et al. |
| 8,575,261 B2 | 11/2013 | Zhao et al. |
| 8,841,383 B2 | 9/2014 | Rodgers et al. |
| 2002/0061979 A1 | 5/2002 | Wolff et al. |
| 2003/0096904 A1 | 5/2003 | Hakuta et al. |
| 2004/0242782 A1 | 12/2004 | Nakano et al. |
| 2017/0133121 A1 | 5/2017 | Yu et al. |
| 2017/0292013 A1 | 10/2017 | Blok et al. |
| 2021/0017369 A1 | 1/2021 | Blok et al. |

FOREIGN PATENT DOCUMENTS

| | | | | |
|---|---|---|---|---|
| DE | 19653371 A1 | 6/1998 | | |
| WO | WO-2016053541 A1 * | 4/2016 | ............... | B60C 1/00 |

* cited by examiner

*Primary Examiner* — Angela C Scott

(57) ABSTRACT

Elastomeric compositions comprising propylene-ethylene-diene terpolymer based polyolefin additives useful in tire tread compositions. The elastomeric compositions comprise 100 phr (parts by weight per hundred parts of total elastomer) diene elastomers; about 0 to about 80 phr of processing oil; 0 to about 80 phr of a hydrocarbon resin; about 60 to about 140 phr of filler; a curative agent; and about 5 to about 30 phr of a silane functionalized propylene-ethylene-diene terpolymer. The silane functionalized propylene-ethylene-diene terpolymer comprises from about 2 wt. % to about 40 wt. % of ethylene and/or $C_4$-$C_{20}$ α-olefins derived units, from 0.5 to 10 wt % of diene derived units, and a silane coupling agent. The present elastomeric compositions are useful as tire tread compositions for improved tire performance.

15 Claims, 5 Drawing Sheets

PROPYLENE ETHYLENE DIENE TERPOLYMER POLYOLEFIN ADDITIVES FOR IMPROVED TIRE TREAD PERFORMANCE

CROSS-REFERENCE TO RELATED APPLICATIONS

This application is a U.S. national phase application of PCT application No. PCT/US2019/033647 having a filing date of May 23, 2019, which claims priority to and the benefit of U.S. provisional application Ser. No. 62/675,795 having a filing date of May 24, 2018, the contents of both of which are incorporated by reference in their entirety.

FIELD OF THE INVENTION

The present invention relates to propylene-ethylene-diene terpolymers useful for tire treads.

BACKGROUND OF THE INVENTION

Miscible resins are often used in tread compositions of passenger tires in order to increase traction characteristics. Although a miscible resin can increase overall traction, these tread compositions tend to suffer from reduced traction and handling at high speed and high tire temperature.

Certain problems observed in passenger tires at high speeds and temperatures have been solved by adding high softening point im miscible resins and resin blends to the tire tread compositions used in race car tires. For instance, it has been observed that using resins having high G' (storage modulus) values at high temperatures together with high tangent delta (ratio of loss modulus to storage modulus) values can improve tire performance at high speeds and temperatures. Moreover, in certain instances, functionalized resins have been found useful.

However, the tire tread composition dictates wear, traction, and rolling resistance of the tire, and it is a technical challenge to deliver excellent traction and low rolling resistance while providing good tread wear. Raising the compound's glass transition termperature (Tg) provides better wet traction but, at the same time, increases the rolling resistance and tread wear. The challenge, therefore, often lies in the trade-off between wet traction and rolling resistance/tread wear.

For example, NANOPRENE™ is an additive used to increase the wet traction without affecting rolling resistance. More specifically, NANOPRENE™ is a sub-micron to micron sized gels from Lanxess having cross-linked butadiene cores and acrylic shells. NANOPRENE™, however, can only deliver limited improvement in wet traction. Likewise, functionalized SBR (styrene butadiene rubber) can improve filler dispersion. However, problems arise in curing the polyolefin domains to generate a robust interface between the polyolefin and the tread matrix.

Silane coupling agent such as Bis[3-(triethoxysilyl)propyl]polysulfide, also known as TESPT or Si69, is commonly used as a functional additive that can react with fillers containing silanol groups during mixing. Si69 can also react with polymer during a vulcanization process to impart improved mechanical properties and dynamic properties of the rubber compound. The drawback of Si69 is its high tendency to undergo hydrolysis and self-condensation reaction to form Si—O—Si linkage, thus affecting the product stability.

A need exists, therefore, for tire tread compositions having silane functionalized additives which are stable and can improve both the rolling resistance and wet braking simultaneously.

SUMMARY OF THE INVENTION

Described herein are elastomeric compositions comprising silane functionalized polyolefin additives useful in tire tread applications which include the following components: propylene-ethylene-diene terpolymers having a silane coupling agent; and an antioxidant. The additive can further comprise a curative agent and one or more fillers.

To balance the wet traction performance and rolling resistance in a tire tread, a tire tread composition can comprise following components: 100 phr (parts by weight per hundred parts of total elastomer) diene elastomers; about 0 to about 80 phr of processing oil; 0 to about 80 phr of a hydrocarbon resin; about 60 to about 140 phr of filler; a curative agent; and about 5 to about 30 phr of a silane functionalized propylene-ethylene-diene terpolymer. The silane functionalized propylene-ethylene-diene terpolymer comprises from about 2 wt. % to about 40 wt. % of ethylene, and/or $C_4$-$C_{20}$ α-olefins derived units, an antioxidant, a silane coupling agent and optionally, a curative agent. The level of the propylene-ethylene-diene terpolymer(s) relative to the other components, and its comonomer content, can be varied to improve the balance of wet traction and rolling resistance of a tire tread.

DETAILED DESCRIPTION OF THE INVENTION

Figure 1A:
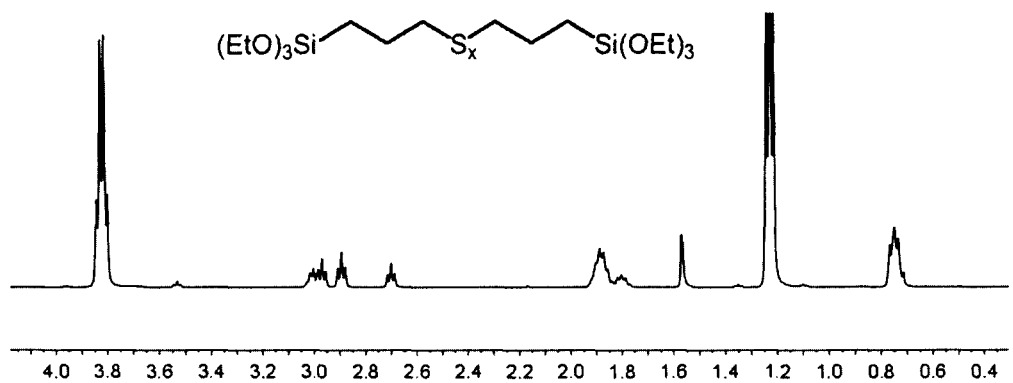
FIG. 1A shows the $^1$H NMR of control silane (TESPT) fresh from the bottle under ambient conditions in $CDCl_3$.

Provided herein are elastomeric compositions comprising silane functionalized propylene-ethylene-diene terpolymer based polyolefin additives useful in tire tread compositions. The propylene-ethylene-diene terpolymers are prepared by polymerizing propylene with at least one of ethylene and/or $C_4$-$C_{20}$ α-olefins, and one or more dienes such as ethylidene norbornene. The propylene-ethylene-diene terpolymers contain from propylene-ethylene-diene terpolymer comprising from 2% to 40% by weight of ethylene, from 1.0% to 21% by weight of a diene. The polyolefin additive forms an immiscible phase in the tread compounds and comprises propylene-ethylene-diene terpolymers, an antioxidant and a silane coupling agent. When compounding tire tread composition, the polyolefin additive concentrates carbon black and an antioxidant in the polyolefin domain together with a functionalized polyolefin to improve abrasion resistance, cure state and UV stability.

The tire tread composition is an important aspect in a tire that dictates wear, traction, and rolling resistance. It is a technical challenge to deliver excellent traction and low rolling resistance while providing good tread wear. The challenge lies in the trade-off between wet traction and rolling resistance/tread wear. Raising the composition's Tg would provide good wet traction but, at the same time, increase the rolling resistance and tread wear. The aspects described herein provide a tread compound additive that can accomplish wet traction without lowering the rolling resistance and tread wear.

The problem has been approached by developing an additive, a polypropylene-ethylene-diene terpolymer that increases hysteresis in the wet traction region (0° C.) and lowers hysteresis in the rolling resistance region (60° C.) without changing the overall compound Tg.

The additive compounding step addresses known deficiencies of polyolefin blends comprising styrene-butadiene rubber/polybutadiene/natural rubber (SBR/PBD/NR) compositions by concentrating the carbon black and antioxidant in the polyolefin domain to improve abrasion resistance, cure state and UV stability. These deficiencies include poorly vulcanized and poorly reinforced polyolefin domains as curatives and fillers migrate away from the polyolefin due to unfavorable solubility parameter differences. The present aspects of the polyolefin additives and tire tread compositions described herein overcome one or more of these deficiencies.

Propylene-Ethylene-Diene Terpolymer

The "propylene-ethylene-diene terpolymer" as used herein may be any polymer comprising propylene and other comonomers. The term "polymer" refers to any carbon-containing compound having repeat units from one or more different monomers. The term "terpolymer" as used herein refers to a polymer synthesized from three different monomers. Terpolymers, in some embodiments, may be produced (1) by mixing all three monomers at the same time or (2) by sequential introduction of the different comonomers. The mixing of comonomers may be done in one, two, or possible three different reactors in series and/or in parallel. Preferably the propylene-ethylene-diene terpolymer comprises (i) propylene-derived units, (ii) α-olefin-derived units and (iii) diene-derived units. The propylene-ethylene-diene terpolymer may be prepared by polymerizing (i) propylene with (ii) at least one of ethylene and $C_4$-$C_{20}$ α-olefins and (iii) one or more dienes.

The comonomers may be linear or branched. Linear comonomers include ethylene or $C_4$ to $C_8$ α-olefins, more preferably ethylene, 1-butene, 1-hexene, and 1-octene, even more preferably ethylene or 1-butene. Branched comonomers include 4-methyl-1-pentene, 3-methyl-1-pentene, and 3,5,5-trimethyl-1-hexene. In an aspect, the comonomers can include styrene.

The dienes may be conjugated or non-conjugated. Preferably, the dienes are non-conjugated. Illustrative dienes may include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and combinations thereof. Preferably, the diene is ENB or VNB. Preferably, the propylene-ethylene-diene terpolymer comprises an ENB content of from 0.5 wt % to 5 wt % based on the weight of the terpolymer, or from 1 wt % to 5 wt %, or from 2 wt % to 4 wt %.

The propylene-ethylene-diene terpolymer may have a propylene amount of from 60 wt. % to 95 wt. %, or from 65 wt. % to 95 wt. %, or from 70 wt. % to 95 wt. %, or from 75 wt. % to 95 wt. %, or from 80 wt. % to 95 wt. %, or from 83 wt. % to 95 wt. %, or from 84 wt. % to 95 wt. %, or from 84 wt. % to 94 wt. %, or from 75 wt % to 90 wt % based on the weight of the polymer. The balance of the propylene-ethylene-diene terpolymer comprises at least one of ethylene and $C_4$-$C_{20}$ α-olefin and, optionally, one or more dienes. The α-olefin may be ethylene, butene, hexane, or octene. When two or more α-olefins are present in the polymer, ethylene and at least one of butene, hexane, or octene are often used.

As provided herein, the propylene-ethylene-diene terpolymer comprises from 2 to 40 wt. % of ethylene ($C_2$) and/or $C_4$-$C_{20}$ α-olefins based the weight of the propylene-ethylene-diene terpolymer. When two or more of ethylene and $C_4$-$C_{20}$ α-olefins, are present the combined amounts of these olefins in the polymer is at least 5 wt. % and falling within the ranges described herein. Other ranges for the amount of ethylene and/or one or more α-olefins include: 2 wt. % to 35 wt. %; 2 wt. % to 30 wt. %; 2 wt. % to 25 wt. %; 2 wt. % to 20 wt. %; 2 to 17 wt. %; 2 wt. % to 16 wt. %; and 5 wt. % to 16 wt. %, each range based on the weight of the propylene-ethylene-diene terpolymer.

The propylene-ethylene-diene terpolymer comprises diene in an amount between 0.2 wt. % to 21 wt. %, 0.5 wt. % to 12 wt. %, 0.5 wt. % to 10 wt. %, 0.6 wt. % to 8 wt. %, and 0.7 wt. % to 5 wt. % of the total weight of terpolymer. Other diene content ranges include: 0.2 wt. % to 10 wt. %; 0.2 wt. % to 5 wt. %; 0.2 wt. % to 4 wt. %; 0.2 wt. % to 3.5 wt. %; 0.2 wt. % to 3.0 wt. %; and 0.2 wt. % to 2.5 wt. %, each range based on the weight of the terpolymer. In an aspect, the propylene-ethylene-diene terpolymer can comprise 5-ethylidene-2-norbornene in an amount of 0.5 wt. % to 10 wt. %, 0.5 wt. % to 4 wt. %, 0.5 wt. % to 2.5 wt. %, and 0.5 wt. % to 2.0 wt. %.

The propylene-ethylene-diene terpolymer has a melt flow rate (MFR, 2.16 kg weight at 230° C.), equal to or greater than 0.2 g/10 min as measured according to the ASTM D-1238. The MFR (2.16 kg at 230° C.) can be between about: 0.2 g/10 min to 10 g/10 min, 0.5 g/10 min to 100 g/10 min; 2 g/10 min to 30 g/10 min; 5 g/10 min to 30 g/10 min; 10 g/10 min to 30 g/10 min; and 10 g/10 min to 25 g/10 min.

The propylene-ethylene-diene terpolymer can have a heat of fusion ($H_f$) determined by the DSC procedure described herein, which is greater than or equal to 0 Joules per gram (J/g), and is equal to or less than 80 J/g, equal to or less than 75 J/g, equal to or less than 70 J/g, equal to or less than 60

J/g, equal to or less than 50 J/g, and equal to or less than 35 J/g. The propylene-ethylene-diene terpolymer can have a heat of fusion that is greater than or equal to 1 J/g, or greater than and equal to 5 J/g. The present propylene-ethylene-diene terpolymers can have a heat of fusion ranging from a lower limit of 1.0 J/g, 1.5 J/g, 3.0 J/g, 4.0 J/g, 6.0 J/g, and 7.0 J/g. The present propylene-ethylene-diene terpolymers can have a heat of fusion ranging to an upper limit of 30 J/g, 35 J/g, 40 J/g, 50 J/g, 60 J/g, 70 J/g, 75 J/g, and 80 J/g.

The crystallinity of the propylene-ethylene-diene terpolymer can be expressed in terms of percentage of crystallinity (i.e., % crystallinity), as determined according to the DSC procedure described herein. The propylene-ethylene-diene terpolymer can have a percent (%) crystallinity of 0% to 40%, 1% to 30%, and 5% to 25%. In an aspect, the propylene-ethylene-diene terpolymer can have crystallinity of less than 40%, 0.25% to 25%, 0.5% to 22%, and 0.5% to 20%.

The propylene-ethylene-diene terpolymer can have a single broad melting transition. However, the propylene-ethylene-diene terpolymer can show secondary melting peaks adjacent to the principal peak. As provided herein, such secondary melting peaks are considered together as a single melting point, with the highest of these peaks (relative to baseline as described herein) as the melting point of the propylene-ethylene-diene terpolymer.

The Differential Scanning Calorimetry (DSC) procedure may be used to determine heat of fusion and melting temperature of the propylene-ethylene-diene terpolymer. The method is as follows: approximately 6 mg of material placed in microliter aluminum sample pan. The sample is placed in a Differential Scanning Calorimeter (Perkin Elmer Pyris 1 Thermal Analysis System) and is cooled to −80° C. The sample is heated at 10° C./min to attain a final temperature of 120° C. The sample is cycled twice. The thermal output, recorded as the area under the melting peak of the sample, is a measure of the heat of fusion and may be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The propylene-ethylene-diene terpolymer can have a triad tacticity of three propylene units, as measured by $^{13}$C NMR of 75% or greater, 80% or greater, 82% or greater, 85% or greater, and 90% or greater. Other ranges include: 75% to 99%; 80% to 99%; and 85% to 99%. Triad tacticity is determined by the methods described in US 2004/0236042.

The propylene-ethylene-diene terpolymer can be a blend of discrete random propylene-ethylene-diene terpolymers as long as the polymer blend has the properties of the propylene-ethylene-diene terpolymer as described herein. The number of propylene-ethylene-diene terpolymers can be three or less, or two or less. In one or more aspects, the propylene-ethylene-diene terpolymer can include a blend of two propylene-ethylene-diene terpolymers differing in the olefin content, the diene content, or the both. Preparation of such polymer blend can be found in US 2004/0024146 and US 2006/0183861.

Silane functionalized propylene-ethylene-diene terpolymers can be be prepared with the silane coupling agents described herein, and in accordance with the methods described in the Examples.

The present elastomeric compositions comprise the silane functionalized propylene-ethylene-diene terpolymer in an amount of from about 5 phr to about 30 phr, or from about 5 phr to about 25 phr, or from about 6 phr to about 9 phr. The present elastomeric compositions comprise the silane functionalized propylene-ethylene-diene terpolymer in an amount of 30 wt. % to 95 wt. %, based on the weight of the composition. The elastomeric composition has at least 5 wt. %, 10 wt. %, 15 wt. %, 20 wt. %, 25 wt. %, 30 wt. %, 35 wt. %, 40 wt. %, 50 wt. %, 60 wt. %, 70 wt. %, or 75 wt. % of propylene-ethylene-diene terpolymer. The elastomeric composition comprises a maximum amount of the propylene-ethylene-diene terpolymer in an amount of 80 wt. %, 85 wt. %, 90 wt. %, or 95 wt. %, based on the weight of the composition.

Elastomers

The elastomeric compositions also comprise an elastomer. In terms of phr, the elastomeric compositions comprise 100 phr of an elastomer. The range of the elastomer is from 5 to 75% by weight of the elastomeric composition. Suitable elastomers include, for example, diene elastomers.

"Diene elastomer" means an elastomer resulting at least in part (homopolymer or copolymer) from diene monomers (monomers bearing two double carbon-carbon bonds, whether conjugated or not). The diene elastomer can be "highly unsaturated," resulting from conjugated diene monomers, which have a greater than 50% molar content of units.

According to an aspect, each diene elastomer having a Tg from −75° C. to 0° C. is selected from the group consisting of styrene butadiene copolymers, natural polyisoprenes, synthetic polyisoprenes having a cis-1,4 linkage content greater than 95%, styrene/butadiene/isoprene terpolymers and a mixture of these elastomers, and each diene elastomer having a Tg from −110° C. to −75° C., and from −100° C. to −80° C., is selected from the group consisting of polybutadienes having a cis-1,4 linkage content greater than 90% and isoprene/butadiene copolymers comprising butadiene units in an amount equal to or greater than 50%.

In another aspect, each diene elastomer having a Tg from −75° C. to −40° C. is selected from the group consisting of natural polyisoprenes and synthetic polyisoprenes having a cis-1,4 linkage content greater than 95%, and each diene elastomer having a Tg from −110° C. to −75° C. is a polybutadiene having a cis-1,4 linkage content greater than 90%, or greater than 95%.

In an aspect, the composition comprises a blend of at least one of the polybutadienes having a cis-1,4 linkage content greater than 90% with at least one of the natural or synthetic polyisoprenes (having a cis-1,4 linkage content greater than 95%).

In another aspect, the composition comprises a blend of at least one of the polybutadienes having a cis-1,4 linkage content greater than 90% with at least one of the terpolymers of styrene, isoprene and butadiene.

Diene elastomers can be classified into two categories: "essentially unsaturated" or "essentially saturated". The term "essentially unsaturated" means the diene elastomer results, at least in part, from conjugated diene monomers having a level of units of diene origin (conjugated dienes) greater than 15 mole percent (mol %). Thus, diene elastomers such as butyl rubbers or copolymers of dienes and of alpha-olefins of EPDM type are not essentially unsaturated; but can be described as "essentially saturated" diene elastomers (low or very low level of units of diene origin, always less than 15%). The term "highly unsaturated" diene elastomer means a diene elastomer having a level of units of diene origin (conjugated dienes) which is greater than 50%.

The diene elastomer can be: (a) any homopolymer obtained by polymerization of a conjugated diene monomer having from 4 to 12 carbon atoms; (b) any copolymer obtained by copolymerization of one or more conjugated dienes with one another or with one or more vinylaromatic compounds having from 8 to 20 carbon atoms; and (c) a ternary copolymer obtained by copolymerization of ethylene and of an alpha-olefin having 3 to 6 carbon atoms with a non-conjugated diene monomer having from 6 to 12 carbon atoms; and (d) a copolymer of isobutene and of isoprene (butyl rubber). Halogenated diene elastomer can be chlorinated or brominated. In an aspect, ethylene and propylene elastomers having a non-conjugated diene monomer of the abovementioned type can be 1,4-hexadiene, ethylidenenorbomene or dicyclopentadiene.

Suitable conjugated dienes include, but are not limited to, 1,3-butadiene, 2-methyl-1,3-butadiene, 2,3-di(C1-C5 alkyl)-1,3-butadienes, such as 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise 99% to 20% by weight of diene units and 1% to 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or micro-sequential elastomers and can be prepared in dispersion or in solution; they can be coupled and/or star-branched or also functionalized with a coupling and/or star-branching or functionalization agent. For coupling to carbon black, for example, of functional groups comprising a C—Sn bond or aminated functional groups, such as benzophenone, for example; for coupling to a reinforcing inorganic filler, such as silica, of, for example, silanol or polysiloxane functional groups having a silanol ends, alkoxysilane groups, carboxyl groups, or polyether groups.

Suitable polybutadienes are as follows: polybutadienes having a content (molar %) of 1,2-units of 4% to 80% or those having a content (molar %) of cis-1,4-units of greater than 80%, polyisoprenes, butadiene/styrene copolymers and polybutadienes having a Tg (glass transition temperature, measured according to Standard ASTM D3418) of 0° C. to −70° C. and more particularly −10° C. to −60° C., a styrene content of 5% to 60% by weight and more particularly 20% to 50%, a content (molar %) of 1,2-bonds of the butadiene part of 4% to 75% and a content (molar %) of trans-1,4-bonds of 10% to 80%, butadiene/isoprene copolymers. Suitable polybutadienes can have an isoprene content of 5% to 90% by weight and a Tg of −40° C. to −80° C., or isoprene/styrene copolymers, in particular those having a styrene content of 5% to 50% by weight and a Tg of −25° C. to −50° C. In the case of butadiene/styrene/isoprene copolymers, those having a styrene content of 5% to 50% by weight and more particularly of 10% to 40%, an isoprene content of 15% to 60% by weight and more particularly 20% to 50%, a butadiene content of 5% to 50% by weight and more particularly of 20% to 40%, a content (molar %) of 1,2-units of the butadiene part of 4% to 85%, a content (molar %) of trans-1,4-units of the butadiene part of 6% to 80%, a content (molar %) of 1,2-plus 3,4-units of the isoprene part of 5% to 70% and a content (molar %) of trans-1,4-units of the isoprene part of from 10% to 50%, and more generally any butadiene/styrene/isoprene copolymer having a Tg of from −20° C. to −70° C., are suitable in particular.

The diene elastomer can be selected from the group of highly unsaturated diene elastomers consisting of polybutadienes (abbreviated to "BR"), synthetic polyisoprenes (IR), natural rubber (NR), butadiene copolymers, isoprene copolymers and the mixtures of these elastomers. Copolymers can be selected from the group consisting of butadiene/styrene copolymers (SBR), isoprene/butadiene copolymers (BIR), isoprene/styrene copolymers (SIR) and isoprene/butadiene/styrene copolymers (SBIR).

In an aspect, the diene elastomer is predominantly (i.e., for more than 50 wt. %) an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate styrene content, for example of from 20% to 35% by weight, or a high styrene content, for example from 35 to 45%, a content of vinyl bonds of the butadiene part of from 15% to 70%, a content (molar %) of trans-1,4-bonds of from 15% to 75% and a Tg of from −10° C. to −55° C.; such an SBR can advantageously be used as a mixture with a BR having more than 90% (molar %) of cis-1,4-bonds.

The term "isoprene elastomer" refers to isoprene homopolymer or copolymer. For example, a diene elastomer chosen from the group consisting of natural rubber (NR), synthetic polyisoprenes (IR), the various copolymers of isoprene and the mixtures of these elastomers including isobutene/isoprene copolymers (butyl rubber IM), isoprene/styrene copolymers (SIR), isoprene/butadiene copolymers (BIR) or isoprene/butadiene/styrene copolymers (SBIR). The isoprene elastomer can be natural rubber or a synthetic cis-1,4-polyisoprene; use is made, among these synthetic polyisoprenes, of the polyisoprenes having a level (molar %) of cis-1,4-bonds of greater than 90%, and of greater than 98%.

In an aspect, the elastomeric composition can comprise a blend of a (one or more) "high Tg" diene elastomer exhibiting a Tg of −70° C. to 0° C. and of a (one or more) "low Tg" diene elastomer having a Tg ranging −110° C. to −80° C., −100° C. to −90° C. The high Tg elastomer can be S-SBRs, E-SBRs, natural rubber, synthetic polyisoprenes (exhibiting a level (molar %) of cis-1,4-structures of greater than 95%), BIRs, SIRs, SBIRs and the mixtures of these elastomers. The low Tg elastomer comprises butadiene units according to a level (molar %) at least equal to 70%; it can comprise a polybutadiene (BR) exhibiting a level (molar %) of cis-1,4-structures of greater than 90%.

In an aspect, the elastomeric composition comprises, for example, 30 to 100 phr (parts by weight per hundred parts of total elastomer), in particular 50 to 100 phr, of a high Tg elastomer as a blend with 0 to 70 phr, 0 to 50 phr, of a low Tg elastomer; according to another example, the elastomeric composition comprises, for the whole of the 100 phr, one or more SBR(s) prepared in solution.

In an aspect, the diene elastomer of the present elastomeric composition comprises a blend of a BR (as low Tg elastomer) exhibiting a level (molar %) of cis-1,4-structures of greater than 90% with one or more S-SBRs or E-SBRs (as high Tg elastomer(s)).

The elastomeric composition can comprise a single diene elastomer or a mixture of several diene elastomers. The diene elastomer(s) can used in combination with any type of synthetic elastomer other than a diene elastomer, and even with polymers other than elastomers, for example thermoplastic polymers.

The elastomeric composition can comprise 5 wt. %, 10 to 15 wt. %, 20 wt. % or 25 wt. %, of propylene-ethylene-diene terpolymer (also referred to herein as "propylene-α-olefin elastomer").

Although any styrenic copolymer can be used, frequently used in the tire compositions are styrene-butadiene block copolymer "rubbers." Such rubbers have 10 wt. %, 15 wt. %, 20 wt. % to 30 wt. %, 25 wt. %, or 40 wt. % styrene derived units, by weight of the block copolymer, and within the range of 30 wt. %, 40 wt. %, 45 wt. % to 55 wt. % and 60 or 65 wt. % vinyl groups.

Useful elastomeric compositions can also comprise: 15 to 50 wt. % and 60 wt. % of styrenic copolymer; 5 wt. % to 60 wt. % of a polybutadiene polymer; 0 to 60 wt. % of natural rubber or synthetic polyisoprene; 15 wt. % to 50 wt. % and 60 wt. % of a functionalized styrenic copolymer; 5 wt. % to 60 wt. % of a functionalized polar polybutadiene polymer; 0 wt. %, and 5 wt. % to 60 wt. % of natural rubber or functionalized synthetic polyisoprene; 0 wt. %, 5 wt. % to 20 wt. %, and 40 wt. % of processing oil; 30 wt. % to 80 wt. % of filler such as silica-based filler described herein, or a carbon-based filler; a curative agent; and 5 wt. % to 20 wt. % of propylene-ethylene-diene terpolymer additives described herein; and 0 wt. %, and 5 wt. % to 40 wt. % of a hydrocarbon resin. Each of the weight percentages set out in this paragraph are based on the total weight of the elastomeric composition.

Inorganic Filler

The term "filler" as used herein refers to any material that is used to reinforce or modify physical properties, impart certain processing properties, or reduce cost of an elastomeric composition.

Examples of fillers include, but are not limited to, calcium carbonate, clay, mica, silica, silicates, talc, titanium dioxide, alumina, zinc oxide, starch, wood flour, carbon black, or mixtures thereof. The fillers may be any size and range, for example in the tire industry, from 0.0001 μm to 100 μm.

As used herein, the term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica. Another filler is commercially available by Rhodia Company under the trade name Zeosil™ Z1165.

Use may be made of any type of reinforcing filler known for its capabilities of reinforcing a rubber composition which can be used for the manufacture of tires, for example an organic filler, such as carbon black, a reinforcing inorganic filler, such as silica, or a blend of these two types of filler, in particular a blend of carbon black and silica.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example, N660, N683 or N772). The carbon blacks might, for example, be already incorporated in the isoprene elastomer in the form of a masterbatch (see, for example, Applications WO 97/36724 or WO 99/16600).

The term "reinforcing inorganic filler" should be understood, in the present patent application, by definition, as meaning any inorganic or mineral filler, whatever its color and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 $m^2/g$, from 30 to 400 $m^2/g$. Highly dispersible ("HDS") precipitated silicas, include, for example, of the Ultrasil 7000 and Ultrasil 7005 silicas from Degussa, the Zeosil 1165 MP, C5 MP and 1115 MP silicas from Rhodia, the Hi-Sil EZ150G silica from PPG, the Zeopol 8715, 8745 and 8755 silicas from Huber or silicas with a high specific surface. Other examples of inorganic filler being capable of being used, of reinforcing aluminum (oxide), hydroxides, titanium oxides or silicon carbides (see, for example, application WO 02/053634 or US 2004/0030017).

For tire tread compositions with a low rolling resistance, the silica filler has a BET surface from 45 to 400 $m^2/g$, and from 60 to 300 $m^2/g$.

The amount of filler (also referred to as "reinforcing filler") in the tire tread composition ranges from 20 phr to 200 phr, and 30 phr to 150 phr. The amount of filler depends on the specific application targeted, and the level of the reinforcement required. For example, the amount of the filler in a tire capable of running at high speed in a sustained manner, for example, a motor cycle tire, or a tire for a passenger vehicle or a tire for a heavy duty commercial vehicle, such as a truck, will be different from the amount of filler in a bicycle tire.

Coupling Agents

As used herein, the term "coupling agent" is meant to refer to any agent capable of facilitating stable chemical and/or physical interaction between two otherwise non-interacting species, e.g., between a filler and a diene elastomer. Coupling agents cause silica to have a reinforcing effect on the rubber. Such coupling agents may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In an aspect, the coupling agent is a silane coupling agent. Non-limiting examples of silane coupling agents include organosilanes or polyorganosiloxanes. Particular silanes used in the present terpolymer and tire tread compositions include silanes of the following structures:

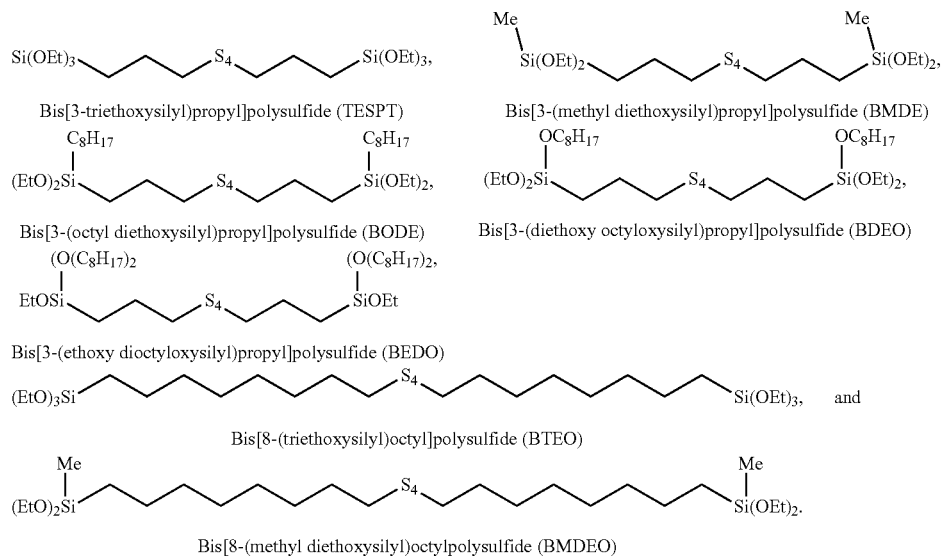

Each of above silane structures have an associated identifier after the structure which is used in the Examples below.

Other examples of suitable silane coupling agents include silane polysulfides, referred to as "symmetrical" or "unsymmetrical" depending on their specific structure.

Silane polysulphides can be described by the formula (V):

$$Z\text{-}A\text{-}S_x\text{-}A\text{-}Z \quad (V),$$

in which x is an integer from 2 to 8 (preferably from 2 to 5); the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene); the Z symbols, which are identical or different, correspond to one of the three formulae (VI):

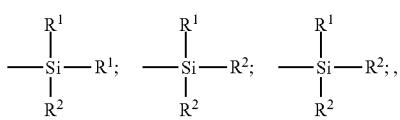

in which the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (i.e., $C_1$-$C_6$ alkyl, cyclohexyl or phenyl groups, in particular $C_1$-$C_4$ alkyl groups, more particularly methyl and/or ethyl); the $R^2$ radicals, which are substituted or unsubstituted and identical to or different from one another, represent a $C_1$-$C_{18}$ alkoxyl or $C_5$-$C_{18}$ cycloalkoxyl group (i.e., a group selected from $C_1$-$C_8$ alkoxyls and $C_5$-$C_8$ cycloalkoxyls, still a group selected from $C_1$-$C_4$ alkoxyls, in particular methoxyl and ethoxyl).

Non-limiting examples of silane polysulphides include bis(($C_1$-$C_4$)alkoxy($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Further examples include bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Other examples include bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl) tetrasulphide.

The silane coupling agent can also be bifunctional POSs (polyorganosiloxanes), hydroxysilane polysulphides, silanes, or POSs bearing azodicarbonyl functional groups. The coupling agent can also include other silane sulphides, for example, silanes having at least one thiol (—SH) functional group (referred to as mercaptosilanes) and/or at least one masked thiol functional group.

The silane coupling agent can also include combinations of one or more coupling agents such as those described herein, or otherwise known in the art. A coupling agent can comprise alkoxysilane or polysulphurized alkoxysilane. A polysulphurized alkoxysilane is bis(triethoxysilylpropyl) tetrasulphide, which is commercially available by Degussa under the trade name X50S™.

The coupling agent can also include combinations of one or more coupling agents such as those described herein, or otherwise known in the art. For example, the coupling agent may be a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur. Among these, for a rubber composition for tires is the sulfur-based coupling agent.

Plasticizer

As used herein, the term "plasticizer" (also referred to as a processing oil), refers to a petroleum derived processing oil and synthetic plasticizer. Such oils are primarily used to improve the processability of the composition. Suitable plasticizers include, but are not limited to, aliphatic acid esters or hydrocarbon plasticizer oils such as paraffinic oils, aromatic oils, naphthenic petroleum oils, and polybutene oils. A particularly preferred plasticizer is naphthenic oil, which is commercially available by Nynas under the trade name Nytex™ 4700.

MES and TDAE oils are described in KGK (Kautschuk Gummi Kunstoffe), 52nd year, No. 12/99, pp. 799-805, entitled "Safe Process Oils for Tires with Low Environmental Impact". Examples of MES oils (whether "extracted" or "hydrotreated") and TDAE oils are sold under the names Flexon™ 683 by ExxonMobil, Vivatec™ 200 or Vivatec™ 500 by H&R European, Plaxolene™ MS by Total, or Catenex™ SNR by Shell.

"Triester" and "fatty acid" refers to a mixture of triesters or a mixture of fatty acids, respectively. A fatty acid is constituted majoritarily (greater than 50%, or more specifically, greater than 80% by weight) of an unsaturated Cis fatty acid. For example, fatty acids include oleic acid, linoleic acid, linolenic acid and mixtures thereof. Whether sythetic or natural in origin, fatty acids constitute more that 50% by weight and more than 80% by weight of oleic acid.

Further, glycerol trioleate, derived from oleic acid and glycerol, can be used. Examples of glycerol trioleates include vegetable oils sunflower oil or rapeseed oil having a high content of oleic acid (more than 50%, and more than 80% by weight).

The glycerol triester is used in a preferred amount of between 5 and 80 phr, more preferably of between 10 and 50 phr, in particular within a range from 15 to 30 phr, in particular when the tread of the invention is intended for a passenger-type vehicle. In the light of the present description, the person skilled in the art will be able to adjust this amount of ester as a function of the specific conditions of embodiment of the invention, in particular the amount of inorganic filler used.

Resins formed of $C_5$ fraction/vinylaromatic copolymer, in particular of $C_5$ fraction/styrene or $C_5$ fraction/$C_9$ fraction copolymer can be used as tackifiers for adhesives and paints, but are also useful as processing aids in tire tread compositions.

A $C_5$ fraction/vinylaromatic copolymer can be a copolymer of a vinylaromatic monomer and of a $C_5$ fraction. Styrene, alpha-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene and any vinylaromatic monomer resulting from a $C_9$ fraction (or more generally from a $C_8$ to $C_{10}$ fraction), for example, are suitable as vinylaromatic monomers. The vinylaromatic compound is styrene or a vinylaromatic monomer resulting from a $C_9$ fraction (or more generally from a $C_8$ to $C_{10}$ fraction).

The term $C_5$ fraction (or, for example, $C_9$ fraction respectively) means any fraction resulting from a process resulting from petrochemistry or from the refining of petroleum, any distillation fraction predominantly comprising compounds having 5 (or respectively 9, in the case of a $C_9$ fraction) carbon atoms. By way of example $C_5$ fractions can comprise the following compounds, the relative proportions of which can vary according to the process by which they are obtained: 1,3-butadiene, 1-butene, 2-butenes, 1,2-butadiene, 3-methyl-1-butene, 1,4-pentadiene, 1-pentene, 2-methyl-1-butene, 2-pentenes, isoprene, cyclopentadiene, which can be present in the form of its dicyclopentadiene dimer, piperylenes, cyclopentene, 1-methylcyclopentene, 1-hexene, methylcyclopentadiene or cyclohexene. These fractions can be obtained by chemical processes known in the petroleum industry and petrochemistry. Processes for the steam cracking of naphtha or processes for the fluid catalytic cracking of gasolines can be combined with chemical treatments to convert these fractions including, but not limited to, hydrogenation and dehydrogenation.

The plasticizing hydrocarbon resins can be homopolymers or copolymers of cyclopentadiene (CPD) or dicyclopentadiene (DCPD), homopolymers or copolymers of terpene, homopolymers or copolymers of terpene, homopolymers or copolymers of $C_5$ cut and mixtures thereof. Such copolymer plasticizing hydrocarbon resins include, for example, resins made up of copolymers of (D)CPD/vinyl-aromatic, of (D)CPD/terpene, of (D)CPD/$C_5$ cut, of terpene/vinyl-aromatic, of $C_5$ cut/vinyl-aromatic and of combinations thereof.

Terpene monomers useful for the terpene homopolymer and copolymer resins include alpha-pinene, beta-pinene and limonene, and polymers of the limonene monomers that include three isomers: the L-limonene (laevorotatory enantiomer); the D-limonene (dextrorotatory enantiomer); and dipentene, a racemic mixture of the dextrorotatory and laevorotatory enantiomers.

Examples of vinyl aromatic monomers include styrene, alpha-methylstyrene, orhto-, meta-, para-methylstyrene, vinyl-toluene, para-tertiobutylstyrene, methoxystyrenes, chloro-styrenes, vinyl-mesitylene, divinylbenzene, vinylnaphthalene, any vinyl-aromatic monomer coming from the $C_9$ cut (or, more generally, from a $C_8$ to $C_{10}$ cut), including a vinyl-aromatic copolymer include the vinyl-aromatic in the minority monomer, expressed in molar fraction, in the copolymer.

Plasticizing hydrocarbon resins include (D)CPD homopolymer resins, the (D)CPD/styrene copolymer resins, the polylimonene resins, the (D)CPD/styrene copolymer resins, the polylimonene resins, the limonene/styrene copolymer resins, the limonene/D(CPD) copolymer resins, $C_5$ Cut/styrene copolymer resins, $C_5$ Cut/$C_9$ cut copolymer resins, and mixtures thereof.

Antioxidant

As used herein, the term "antioxidant" refers to a chemical that combats oxidative degradation. Suitable antioxidants include diphenyl-p-phenylenediamine and those disclosed in *The Vanderbilt Rubber Handbook* (1978), Pages 344 to 346. A useful antioxidant is para-phenylenediamines, which is commercially available by Eastman under the trade name Santoflex™ 6PPD (N-(1,3-Dimethylbutyl)-N'-phenyl-1,4-phenylenediamine).

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry. A useful crosslinking agent is sulfur.

Processing

The present elastomeric compositions can be compounded (mixed) by any conventional means known to those skilled in the art. The mixing can occur in a single step or in multiple stages. For example, the ingredients are mixed in at least two stages, namely at least one non-productive stage followed by a productive mixing stage. The terms "non-productive" and "productive" mix stages are well known to those having skill in the rubber mixing art. The elastomers, polymer additives, silica and silica coupler, and carbon black, if used, are generally mixed in one or more non-productive mix stages. The polymers are mixed first at 110° C. to 130° C. for 30 seconds to 2 minutes, followed by addition of the silica, silica coupler and other ingredients, the combination of which is further mixed, at an increasing temperature up to 140° C. to 170° C. for 30 seconds to 3 or 4 minutes. The silica can be mixed in portions, i.e. one half, then the second half. The final curatives are mixed in the productive mix stage. In the productive mix stage, the mixing occurs at a temperature, or ultimate temperature, lower than the mix temperature(s) of the preceding non-productive mix stage(s).

The present elastomeric composition has many desirable properties. The maximum Energy Loss (Tangent Delta, wherein the slope is zero) of the immiscible polyolefin domain of a cured tire tread composition occurs between −30 to 10° C. Finally, domains comprising the compatibilizer in the polymer matrix of the other components have sizes that are less than 20 microns, less than 10 microns, and less than 5 microns; and often within a range of 1.0 to 5 microns, or 10 or 20 microns.

The various descriptive elements and numerical ranges disclosed herein for the propylene-ethylene-diene terpolymers, the reactants used to make the propylene-ethylene-diene terpolymers, and their use in tire tread compositions can be combined with other descriptive elements and numerical ranges to describe the invention(s); further, for a given element, any upper numerical limit can be combined with any lower numerical limit described herein. The features of the invention are described in the following non-limiting examples.

Example 1

Two propylene-ethylene-diene terpolymer (PEDM) additives (Table 1) were used in tire tread formulations of the following examples.

Preparation of Amorphous Propylene-Based Copolymers

Catalyst system: Catalyst precursor was bis((4-triethylsilyl)phenyl)methylene(cyclopentadienyl)(2,7-di-tert-butyl-fluoren-9-yl) hafnium dimethyl. However, other metallocene precursors with good diene incorporation and MW capabilities could also be used.

The activator was dimethylanilinium tetrakis(pentafluorophenyl)borate, but dimethylanilinium-tetrakis(heptafluoronaphthyl)borate and other non-coordinating anion type activators or MAO could also be used.

Polymerization experiments were performed in a continuous stirred tank reactor (CSTR) made by Autoclave Engineers, Erie PA. The reactor was designed to operate at a maximum pressure and temperature of 2000 bar (30 kpsi) and 225° C., respectively, although the current experiments the nominal reactor pressures were lower, from 1600 to 1700 psig. The nominal reactor vessel volume was 150 mL. The working volume was smaller, approximately 120 mL, due to the stirrer. The reactor was equipped with a magnetically coupled external stirrer (Magnedrive). A pressure transducer measured the pressure in the reactor. The reactor temperature was measured using a type-K thermocouple. A flush-mounted rupture disk located on the side of the reactor provided protection against catastrophic pressure failure. All product lines were heated to ~120° C. to prevent fouling. The reactor had an electric heating band that was controlled by a programmable logic control device ("PLC"). Except for the heat losses to the environment, the reactor did not have cooling (semi-adiabatic operations).

The conversion in the reactor was monitored by an on-line gas chromatograph (GC) that sampled both the feed and the effluent. The GC analysis utilized the propane impurity present in the propylene feed as internal standard. The reactor temperature and the temperature difference across the reactor wall was maintained constant by adjusting the reactor heater output (skin temperature) and the catalyst feed rate. The target reactor temperature was maintained at 0.5-3 mol ppm catalyst concentrations in the feed. At these low catalyst concentrations, impurity control was the most critical factor in achieving controlled, steady state reactor conditions. Feed purification traps were used to control impurities carried by the monomer feed. The purification traps were placed right before the feed pumps and comprised of two separate beds in series: activated copper (reduced in flowing $H_2$ at 225° C. and 1 bar) for $O_2$ removal followed by a molecular sieve (5A, activated in flowing $N_2$ at 270° C.) for water removal.

Propylene was fed from a low-pressure cylinder equipped with a dip leg for liquid delivery to the reactor. A heating blanket (Ace) was used to increase the propylene cylinder head pressure to 17 bar (~250 psig). This increased head pressure allowed the monomer to be delivered to the monomer feed pump head at a pressure above its bubble point at the pump. The low-pressure monomer feed was also stabilized against bubble formation by cooling the pump head using 10° C. chilled water. The purified monomer feed was fed by a two-barrel continuous ISCO pump (model 500D). The monomer flow rate was adjusted by adjusting the motor speed of the pump and was measured by a Coriolis mass flow meter (Model PROline Promass 80, Endress and Hauser).

The catalyst feed solution was prepared inside an argon-filled dry box (Vacuum Atmospheres). The atmosphere in the glove box was purified to maintain <1 ppm $O_2$ and <1 ppm water. All glassware was oven-dried for a minimum of 4 hours at 110° C. and transferred hot to the antechamber of the dry box. Stock solutions of the catalyst precursor and the activator were prepared using purified toluene that was stored in amber bottles inside the dry box. Aliquots were taken to prepare fresh activated catalyst solutions. The activated catalyst solution was charged inside the argon-filled dry box to a heavy-walled glass reservoir (Ace Glass, Inc. Vineland, NJ) and was pressurized to 5 psig with argon. The activated catalyst solution was delivered to the unit by a custom made two-barrel continuous high-pressure syringe pump (PDC Machines).

HPLC grade hexane (95% n-hexane, J. T. Baker) was used as solvent. It was purged with Argon for a minimum of four hours and was filtered once over activated basic alumina. The filtered hexane was stored in a 4-liter glass vessel (Ace Glass, Vineland, NJ) inside an argon-filled dry box. The hexane was further purified by adding 1.5 mL (1.05 g) of trioctylaluminum (Aldrich #38,655-3) to the 4-liter reservoir of filtered hexane. 5-10 psig head pressure of argon was applied to the glass vessel to deliver the scavenger solution to a metal feed vessel from which the hexane was delivered to the reactor by a two-barrel continuous ISCO pump (model 500D).

Ethylidene norbornene ("ENB") was purified by filtering through activated basic alumina. The filtered ENB was stored in a 4-liter glass vessel (Ace Glass, Vineland, NJ) inside an argon-filled dry box. 5-10 psig head pressure of argon was applied to the glass vessel to deliver the scavenger solution to a 500 mL single-barrel ISCO pump, which in turn fed diene to the reactor.

Polymerization grade ethylene was compressed by a Fluitron A %-200 compressor and metered by a mass flow meter into the reactor.

During a polymerization experiment, the reactor was preheated to ~10-15° C. below that of the desired reaction temperature. Once the reactor reached the preheat temperature, the solvent pump was turned on to deliver hexane/trioctylaluminum scavenger solution to the reactor from the 4-liter scavenger solution feed vessel. This stream of scavenger/catalyst solution entered the reactor through a port on the top of the stirrer assembly to keep the polymer from fouling the stirrer drive. After the flow of solvent to the reactor was verified by monitoring the amount of solvent taken from the feed vessel, the monomer feeds were turned on. The monomers were fed to the reactor through a side port. The reactor was purged when the pressure increased to ~100 bar (~1.5 kpsi) by opening each valve briefly. This reduced the pressure in the reactor and verified that all ports in the reactor were operational. After all valves had been tested and the reactor reached the desired reaction pressure, the syringe pump containing the activated catalyst solution was pressurized. When the syringe pump pressure exceeded the reactor pressure by 27 bar (~400 psi) an air actuated solenoid valve was opened to allow the catalyst solution to mix with the stream of flowing solvent upstream of the reactor. The arrival of the catalyst to the reactor was indicated by an increase in the reaction temperature caused by the exothermic polymerization reaction. During the line-out period, the catalyst feed rate was adjusted to reach and maintain the target reaction temperature and conversion. The products were collected and weighed after vacuum-drying overnight at 70° C. Aliquots of the product were used for characterization without homogenizing the entire product yield.

The ENB contents were determined using a Nicolet 6700 FTIR with Omnic 7.1 software following the ASTM D6047-99.

Melt Index ("MI") of polymers was determined by using Dynisco Kayeness Polymer Test Systems Series 4003 apparatus following ASTM D1238-13 and ISO 1133-1:2011 methods. The protocol for the measurement is described in the Series 4000 Melt Indexer Operation manual, Method B.

The $C_2$ contents were determined by using a Fourier transform infrared spectrophotometer (FTIR), extension of the existing methods described in ASTM D3900-17. The ethylene content is determined by measuring the area of the infrared absorbance of the propylene methyl wag centered between 1155 $cm^{-1}$ and 1166 $cm^{-1}$ and of the methylene rocking band centered between 722 $cm^{-1}$ and 732 $cm^{-1}$. The propylene base points are determined by finding the minimum absorbance value between 1245 $cm^{-1}$ and the propylene peak and between 1110 $cm^{-1}$ and the propylene peak. If no minimum is found the end point of 1245 or 1110 $cm^{-1}$ is used. The ethylene base points are determined by finding the minimum absorbance value between 785 $cm^{-1}$ and the ethylene peak and between 675 $cm^{-1}$ and the ethylene peak. If no minimum is found the end point of 785 or 675 $cm^{-1}$ is used.

The ratio of these areas (APropyl/AEthyl)=AR is calculated and then correlated to the mass fraction of ethylene by calibrating the instrument with well-characterized propylene-ethylene copolymers standards.

During the development of this method, the best fit of the experimental data was obtained by using an expression of the above ratio [AR/(AR+1)] and by correlation with the ethylene content of the standards via a quadratic least square regression.

Example 2

Sample Preparation of Compounds

Additive mixing: Additive 1-6 compound compositions are according to Table 2 where PEDM terpolymers in Table 1 is used to produce the corresponding PEDM compounds. All components are listed in phr, or part per hundred, of polymer unit. These compounds were mixed in suitable mixers, using at least two successive passes well known to the person skilled in the art. The mixing temperatures range between 110° C. and 210° C. The duration of the mixing for each of the individual mixing steps is between 1 and 30 minutes depending on desired property.

TABLE 1

| | PEDM composition | | |
| --- | --- | --- | --- |
| Terpolymer | C2 (%) | ENB (%) | MFR (g/10 min) |
| PEDM 1 | 16.7 | 11.3 | 6.26 |
| PEDM 2 | 15.2 | 3 | 0.76 |

TABLE 2

| | COMPONENTS OF POLYOLEFIN ADDITIVES | | | | | |
| --- | --- | --- | --- | --- | --- | --- |
| Sample Component* | Additive 1 | Additive 2 | Additive 3 | Additive 4 | Additive 5 | Additive 6 |
| PEDM 1 | 100.00 | 100.00 | 100.00 | | | |
| PEDM 2 | | | | 100.00 | 100.00 | 100.00 |
| Carbon Black (N330) | 8.00 | 8.00 | 8.00 | 8.00 | 8.00 | 8.00 |
| CHIMAS-SORB 2020 | 0.80 | 0.80 | 0.80 | 0.80 | 0.80 | 0.80 |
| 388 Super Fine Sulfur | 2.50 | 1.25 | | 2.50 | 1.25 | |
| Stearic acid | 1.00 | 1.00 | 1.00 | 1.00 | 1.00 | 1.00 |
| Akro-Zinc Bar 85 | 1.00 | 1.00 | 1.00 | 1.00 | 1.00 | 1.00 |
| Silane Si 69 | | 2.63 | 5.25 | | 2.63 | 5.25 |
| TOTAL PHR | 113.3 | 114.675 | 116.050 | 113.3 | 114.675 | 116.05 |

CHIMASSORB® 2020 (high-molecular-weight, hindered amine light stabilizer, available from BASF); AKRO-ZINC® BAR 25 (French process zinc oxide in naphthenic oil, available from Akrochem Corporation); N330 carbon black (Vulcan® 3 available from Cabot Corp.); Silane Si®69 (silane coupling agentavailable fromEvonik Industries) Si 69 has the structural formula of

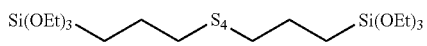

parts by weight per hundred parts of total terpolymer
Silica Tread Compound

Tread compound formulations for the controls and examples are listed in Table 3. All components are listed in phr, or part per hundred, of polymer unit. These compounds were mixed in suitable mixers, using at least two successive passes well known to the person skilled in the art. The non-productive passes (mixing without crosslinking system) which have mixing at high temperatures between 110° C. and 190° C. The non-productive passes are followed by a productive pass where the crosslinking system is added. The temperature for this mixing is typically below 110° C.

Loss Tangent Measurements

The compounds listed in Table 3 were compression molded and cured into pads. Afterward, a rectangular test specimen (12 mm wide & 30 mm long) was died out of the cured pads and mounted in an ARES G2 (Advanced Rheometric Expansion System, TA instruments) for dynamic mechanical testing in torsion rectangular geometry. Though the thickness of the test specimen was around 1.8 mm, the thickness of the specimens varied and was measured manually for each test. A strain sweep at room temperature up to 5.5% strains and at 10 Hz was conducted first followed by a temperature sweep at 4% strain and 10 Hz from −38° C. to 100° C. at 2° C./min ramp rates. Storage and loss moduli were measured along with the loss tangent values. For better wet traction, it is preferred to have higher loss tangent values at temperatures below 0° C. whereas the loss tangent is preferred to be lower at 40° C. or 60° C. for better rolling resistance.

Table 4 provides the loss tangent measurements for the tire tread formulations using PEDM compounds in Table 2, and Table 5 provides the same measurements but as a percentage of the control tire tread formulation TT-1.

TABLE 4

Wet braking: tan delta @ 0° C., higher better
Rolling Resistance: tan delta @ 60° C., lower better

| Temperature | Control | TT-1 | TT-2 | TT-3 | TT-4 | TT-5 | TT-6 |
|---|---|---|---|---|---|---|---|
| 0 | 0.311 | 0.395 | 0.400 | 0.391 | 0.402 | 0.401 | 0.409 |
| 60 | 0.153 | 0.134 | 0.149 | 0.138 | 0.132 | 0.137 | 0.137 |

TABLE 3

| Tire Tread Composition Examples* | Control | TT-1 | TT-2 | TT-3 | TT-4 | TT-5 | TT-6 |
|---|---|---|---|---|---|---|---|
| Non-Productive Pass Components | | | | | | | |
| Styrene-Butadiene SBR (NS 116R) | 58.5 | 58.5 | 58.5 | 58.5 | 58.5 | 58.5 | 58.5 |
| Silica (Z1165) | 67.0 | 67.0 | 67.0 | 67.0 | 67.0 | 67.0 | 67.0 |
| Polybutadiene (CB 24) | 31.5 | 31.5 | 31.5 | 31.5 | 31.5 | 31.5 | 31.5 |
| Natural Rubber polyisoprene (SMR 10) | 10.0 | 10.0 | 10.0 | 10.0 | 10.0 | 10.0 | 10.0 |
| Naphthenic Oil (Nytex 4700) | 15.0 | 15.0 | 15.0 | 15.0 | 15.0 | 15.0 | 15.0 |
| 1,3,-Dimthylbutyl-N-phenyl-p-phenylenediamine (6PPD) | 2.0 | 2.0 | 2.0 | 2.0 | 2.0 | 2.0 | 2.0 |
| Coupling agent (X50 S) | 10.0 | 10.0 | 10.0 | 10.0 | 10.0 | 10.0 | 10.0 |
| Stearic acid | 2.5 | 2.5 | 2.5 | 2.5 | 2.5 | 2.5 | 2.5 |
| Additive 1 | | 20 | | | | | |
| Additive 2 | | | 20 | | | | |
| Additive 3 | | | | 20 | | | |
| Additive 4 | | | | | 20 | | |
| Additive 5 | | | | | | 20 | |
| Additive 6 | | | | | | | 20 |
| Productive Pass Components | | | | | | | |
| Akro-Zinc Bar 85 | 2.0 | 2.0 | 2.0 | 2.0 | 2.0 | 2.0 | 2.0 |
| N-cyclohexyl benzothiazole (CBS) | 1.2 | 1.2 | 1.2 | 1.2 | 1.2 | 1.2 | 1.2 |
| 388 Super Fine Sulfur | 1.4 | 1.4 | 1.4 | 1.4 | 1.4 | 1.4 | 1.4 |
| Diphenyl Guanidine (DPG) | 1.4 | 1.4 | 1.4 | 1.4 | 1.4 | 1.4 | 1.4 |
| TOTAL PHR | 202.490 | 222.49 | 222.49 | 222.49 | 222.49 | 222.49 | 222.49 |

*NIPOL® NS 116R (styrene butadiene rubber with 21% bound styrene, available from Zeon} Corporation);
BUNA® CB 24 (neodymium butadiene rubber, available from Arlanxeo);
SMRTM 10 (natural polymer of cis-polyisoprene, available from Herman Webber & Co.);
ZEOSIL® 1165MP (amorphous precipitated silica, available from Rhodia);
NYTEX® 4700 (a high viscosity naphthenic black oil, available from Nynas AB);
SANTOFLEX™ 6PPD (N-(1,3-Dimethylbutyl)-N'-phenyl-p-phenylenediamine, available from Eastman Chemical); );
X 50S® (bis(triethoxysilylpropyl)tetrasulfide with carbon black, available from Evonik Industries);
AKRO-ZINC® BAR 25 (French process zinc oxide in naphthenic oil, available from Akrochem Corporation)
*per hundred parts of total rubber (NIPOL® NS 116R + BUNA® CB 24 + SMR ™ 10)

TABLE 5

| Temperature | Control | TT-1 | TT-2 | TT-3 | TT-4 | TT-5 | TT-6 |
|---|---|---|---|---|---|---|---|
| 0 | 100 | 127 | 128 | 126 | 129 | 129 | 131 |
| 60 | 100 | 87 | 98 | 90 | 86 | 90 | 90 |

Stress/Strain Measurements

Five test specimens were dies out with ASTM D4482 die and conditioned in the lab for 16 hours before testing.

Specimens were tested on an Instron 5565 with a long travel mechanical extensometer.

The load cell and extensometer are calibrated before each day of testing with 20 mm as the gauge length.

Sample information, operator name, date, lab temperature, and humidity were all recorded.

Specimen thickness was measured at three places in the test area and the average value was entered when prompted. The lab temperature and humidity were measured.

Specimen was carefully loaded in the grips to ensure grips clamp on the specimen symmetrically. The extensometer grips was then attached to the sample in the test area.

The test was prompted to start. A pre-load of 0.1N was applied. Testing began with the crosshead moving at 20 inches/minute until a break is detected.

5 specimens from each sample were tested and the median values were reported.

Table 6 provides the stress/strain measurements for the tire tread formulations using PEDM compounds in Table 2.

TABLE 6

Wear Predictor

| Batch | Control | TT-1 | TT-2 | TT-3 | TT-4 | TT-5 | TT-6 |
|---|---|---|---|---|---|---|---|
| Stress strain data | | | | | | | |
| Modulus @200% (MPa) | 8.5 | 9.2 | 8.3 | 7.4 | 9.4 | 8.1 | 7.7 |
| Ultimate tensile strength (MPa) | 16.6 | 14.7 | 15.6 | 16.6 | 15.9 | 16.6 | 17.9 |
| Ultimate elongation (%) | 338 | 283 | 321 | 358 | 306 | 349 | 378 |
| Stress strain data (Normalized to control) | | | | | | | |
| Modulus @200% | 100 | 108 | 98 | 87 | 111 | 95 | 91 |
| Ultimate tensile strength | 100 | 89 | 94 | 100 | 96 | 100 | 108 |
| Ultimate elongation | 100 | 84 | 95 | 106 | 91 | 103 | 112 |

Example 3

The effluent from the first reactor, containing a first copolymer component, unreacted monomers, and solvent, was fed, with additional monomers, to a second reactor where the polymerization was continued under different process conditions to produce a second copolymer component. The polymerization was performed in solution using isohexane as solvent. During the polymerization process, hydrogen addition and temperature control were used to achieve the desired melt flow rate. The catalyst, activated externally to the reactor, was added as needed in amounts effective to maintain the target polymerization temperature. The PEDM terpolymer was synthesized in two continuous stirred tank reactors connected in series.

In the first reactor, the first copolymer component was produced in the presence of ethylene, propylene, and a catalyst comprising the reaction product of N,N-dimethylanilinium tetrakis(pentafluorophenyl)borate and [cyclopentadienyl(2,7-di-t-butylfluorenyl)di-p-triethylsilanephenylmethane]hafnium dimethyl.

In the second reactor, the second copolymer component was produced in the presence of ethylene, propylene, and a catalyst comprising the reaction product of N,Ndimethylanilinium tetrakis(pentafluorophenyl)borate and [cyclopentadienyl(2,7-di-t-butylfluorenyl) di-p-triethylsilanephenylmethane]hafnium dimethyl.

The mixed copolymer solution emerging from the second reactor was quenched and then devolatilized using conventionally known devolatilization methods, such as flashing or liquid phase separation, first by removing the bulk of the isohexane to provide a concentrated solution, and then by stripping the remainder of the solvent in anhydrous conditions using a devolatilizer so as to end up with a molten polymer composition containing less than 0.5 wt. % of solvent and other volatiles. The propylene-ethylene-diene terpolymer can have a melt flow rate (MFR, 2.16 kg weight at 230° C.), equal to or greater than 0.2 g/10 min as measured according to the ASTM D-1238-13. The molten polymer composition was advanced by a screw to a pelletizer from which the polymer composition pellets are submerged in water and cooled until solid.

Sample Preparation of Compounds

Additive mixing: Additive 7-10 compound compositions are according to Table 8 where PEDM terpolymer in Table 7 is used to produce the corresponding PEDM compounds. All components are listed in phr, or part per hundred, of polymer unit. These compounds were mixed in suitable mixers, using at least two successive passes well known to the person skilled in the art. The mixing temperatures range between 110° C. and 210° C. The duration of the mixing for each of the individual mixing steps is between 1 and 30 minutes depending on desired property.

TABLE 7

| Terpolymer | C2 wt. % | ENB wt. % | MFR |
|---|---|---|---|
| PEDM 3 | 5.4 | 2.6 | 6.9 |

TABLE 8

Polyolefin Additive Formulations

| | Additive 7 | Additive 8 | Additive 9 | Additive 10 |
|---|---|---|---|---|
| Silane* | TESPT | BMDE | BDEO | BEDO |
| PEDM 3 | 100.00 | 100.00 | 100.00 | 100.00 |
| Ultra talc 609 | 2.50 | 2.50 | 2.50 | 2.50 |
| Silane | 1.00 | 0.89 | 1.31 | 1.62 |
| CHIMASSORB 2020 | 0.80 | 0.80 | 0.80 | 0.80 |
| N330 | 8.00 | 8.00 | 8.00 | 8.00 |
| CBS | 0.20 | 0.20 | 0.20 | 0.20 |
| 388 Super Fine Sulfur | 2.50 | 2.50 | 2.50 | 2.50 |
| Zinc Stearate | 0.50 | 0.50 | 0.50 | 0.50 |
| E 5320 | 5.00 | 5.00 | 5.00 | 5.00 |
| DPG | 0.20 | 0.20 | 0.20 | 0.20 |
| TOTAL PHR | 120.70 | 120.59 | 121.01 | 121.32 |

Silica Tread Compound

Tread compound formulations for the controls and examples are listed in Table 9. All components are listed in phr, or part per hundred, of polymer unit. These compounds were mixed in suitable mixers, using at least two successive passes well known to the person skilled in the art. The non-productive passes (mixing without crosslinking system) which have mixing at high temperatures between 110° C. and 190° C. The non-productive passes are followed by a productive pass where the crosslinking system is added. The temperature for this mixing is typically below 110° C.

TABLE 9

Tire Tread Compositions - Formulations

| Tire Tread Composition Examples* | TT-7 | TT-8 | TT-9 | TT-10 |
|---|---|---|---|---|
| Non-Productive Pass Compositions | | | | |
| SBR | 55.5 | 55.5 | 55.5 | 55.5 |
| Silica (Z1165) | 67 | 67 | 67 | 67 |
| CB 24 (cis PBD) | 29.5 | 29.5 | 29.5 | 29.5 |
| Natural rubber (CV 60) | 15 | 15 | 15 | 15 |
| Nytex 4700 (Naphthenic oil) | 15 | 15 | 15 | 15 |
| 6PPD ((1,3-Dimethylbutyl)-N'-phenyl-p-phenylenediamine) | 2 | 2 | 2 | 2 |
| X50S {coupling agent (Si-69/carbon black 50/50)}; N330 CB; Si-69 = Bis(3-triethoxysiylpropyl) tetrasulfide | 10.5 | 10.5 | 10.5 | 10.5 |
| Stearic acid | 2.5 | 2.5 | 2.5 | 2.5 |
| Second Pass Compositions | | | | |
| NP1 | 197 | 197 | 197 | 197 |
| Additive 7 | 20 | | | |
| Additive 8 | | 20 | | |
| Additive 9 | | | 20 | |
| Additive 10 | | | | 20 |
| TOTAL PHR | 217 | 217 | 217 | 217 |
| Productive Pass Compositions | | | | |
| Akro-Zinc Bar 85 | 2 | 2 | 2 | 2 |
| R.M. Sulfur | 1.4 | 1.4 | 1.4 | 1.4 |
| CBS (N-Cyclohexyl Benzothiazole Sulfenamide) | 1.19 | 1.19 | 1.19 | 1.19 |
| DPG Powder (Diphenyl Guanidine) | 1.4 | 1.4 | 1.4 | 1.4 |
| Tire Tread Composition Examples* | TT-7 | TT-8 | TT-9 | TT-10 |
| TOTAL PHR | 220.99 | 220.99 | 220.99 | 220.99 |

*NIPOL® NS 116R (styrene butadiene rubber with 21% bound styrene, available from Zeon Corporation);
BUNA® CB 24 (neodymium butadiene rubber, available from Arlanxeo);
CV60 (natural polymer of cis-polyisoprene, available from Herman Webber & Co.);
ZEOSIL® 1165MP (amorphous precipitated silica, available from Rhodia);
NYTEX® 4700 (a high viscosity naphthenic black oil, available from Nynas AB);
SANTOFLEX™ 6PPD (N-(1,3- Dimethylbutyl)-N'-phenyl-p-phenylenediamine, available from Eastman Chemical); );
X 50S® (bis(triethoxysilylpropyl)tetrasulfide with carbon black, available from Evonik Industries);
AKRO-ZINC® BAR 25 (French process zinc oxide in naphthenic oil, available from Akrochem Corporation);
Silanes were used as received from Shin-Etsu Chemical Co.
*per hundred parts of total rubber (NIPOL® NS 116R + BUNAR CB 24 + CV60)

Loss Tangent Measurements

The compounds listed in Table 9 were compression molded and cured into pads. Afterward, a rectangular test specimen (12 mm wide & 30 mm long) was died out of the cured pads and mounted in an ARES G2 (Advanced Rheometric Expansion System, TA instruments) for dynamic mechanical testing in torsion rectangular geometry. Though the thickness of the test specimen was around 1.8 mm, the thickness of the specimens varied and was measured manually for each test. A strain sweep at room temperature up to 5.5% strains and at 10 Hz was conducted first followed by a temperature sweep at 4% strain and 10 Hz from −38° C. to 100° C. at 2° C./min ramp rates. Storage and loss moduli were measured along with the loss tangent values. For better wet traction, it is preferred to have higher loss tangent values at temperatures below 0° C. whereas the loss tangent is preferred to be lower at 40° C. or 60° C. for better rolling resistance.

Table 10 provides the loss tangent measurements for the tire tread formulations using PEDM compounds in Table 8, and Table 11 provides the same measurements but as a percentage of the control tire tread formulation TT-7.

TABLE 10

Wet breaking: tan delta @ 0° C.
Rolling Resistance: tan delta @ 60° C.

| Temperature | TT-7 | TT-8 | TT-9 | TT-10 |
|---|---|---|---|---|
| 0 | 0.410 | 0.418 | 0.415 | 0.424 |
| 40 | 0.142 | 0.147 | 0.144 | 0.145 |
| 60 | 0.127 | not measured | 0.127 | 0.128 |

TABLE 11

Wet breaking: tan delta @ 0° C.
Rolling Resistance: tan delta @ 60° C.

| Temperature | TT-7 | TT-8 | TT-9 | TT-10 |
|---|---|---|---|---|
| 0 | 100 | 102 | 101 | 104 |
| 40 | 100 | 104 | 101 | 102 |
| 60 | 100 | not measured | 100 | 101 |

In the specification and in the claims, the terms "including" and "comprising" are open-ended terms and should be interpreted to mean "including, but not limited to . . . " These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Example 4

Silanes listed in Table 12 were used as received, and an arbitrary quantity of each was dissolved in a small quantity of $CDCl_3$ (Sigma-Aldrich, prod #151823-100G). The samples were analyzed by $^1$H-NMR on a Bruker Avance III HD 500 MHz spectrometer, and then allowed to age at room temperature under ambient conditions for varying amounts of time. The spectra were periodically acquired following these aging periods and the results reported in FIGS. 1-6 below.

TABLE 12

Silanes received from Shin Etsu Chemical Company.

| Sample ID | Sample Name | Sample Structure |
|---|---|---|
| TESPT | Bis[3-(triethoxysilyl)propyl]polysulfide | $Si(OEt)_3$–propyl–$S_4$–propyl–$Si(OEt)_3$ |
| BDEO | Bis[3-(diethoxy octyloxysilyl)propyl]polysulfide) | $(EtO)_2Si(OC_8H_{17})$–propyl–$S_4$–propyl–$Si(OEt)_2(OC_8H_{17})$ (average structure) |
| BTEO | Bis[8-(triethoxysilyl)octyl]polysulfide | $(EtO)_3Si$–octyl–$S_4$–octyl–$Si(OEt)_3$ |
| BEDO | Bis[3-(ethoxy dioctyloxysilyl)propyl]polysulfide | $EtOSi(OC_8H_{17})_2$–propyl–$S_4$–propyl–$SiOEt(OC_8H_{17})_2$ (average structure) |
| BMDEO | Bis[8-(methyl diethoxysilyl)octyl]polysulfide | $(EtO)_2Si(Me)$–octyl–$S_4$–octyl–$Si(OEt)_2(Me)$ |
| BMDE | Bis[3-(methyl diethoxysilyl)propyl]polysulfide | $(EtO)_2Si(Me)$–propyl–$S_4$–propyl–$Si(OEt)_2(Me)$ |

Figure 1B:
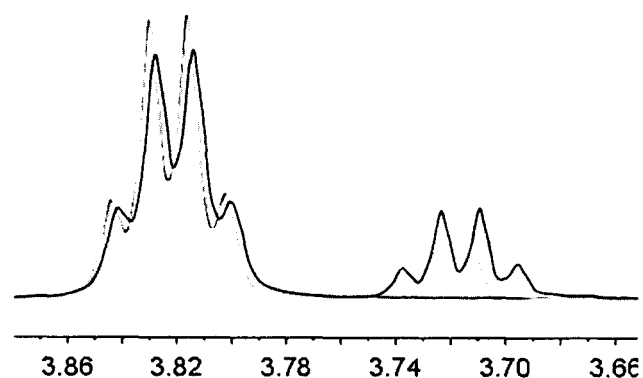
FIG. 1B shows decomposition as evidenced by the appearance of a new quartet at 3.72 ppm, assigned as free EtOH.
Figure 1C:
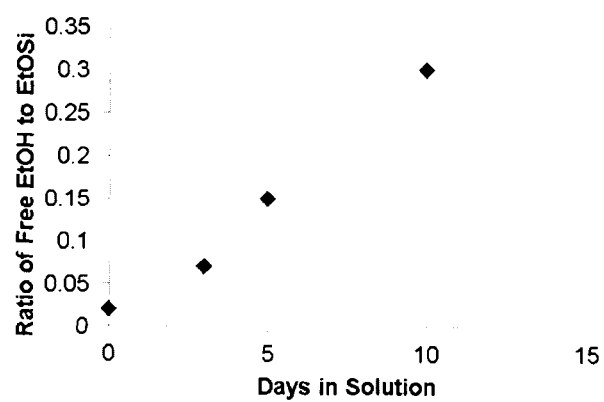
FIG. 1C shows the semi-quantitative analysis of the ratio of free EtOH to SiOEt groups after 3, 5, and 10 days.
Figure 2A:
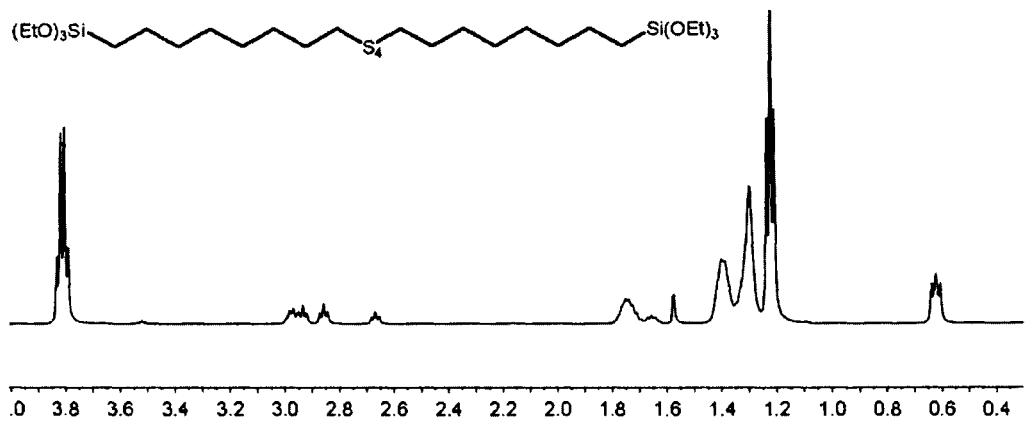
FIG. 2A shows the $^1$H NMR of BTEO silane fresh from the bottle under ambient conditions in $CDCl_3$.
Figure 2B:
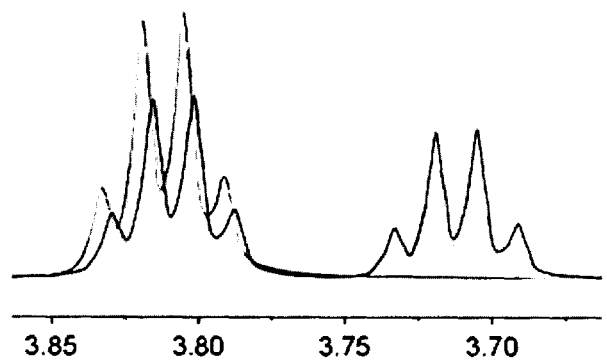
FIG. 2B shows decomposition as evidenced by the appearance of a new quartet at 3.72 ppm, assigned as free EtOH.
Figure 2C:
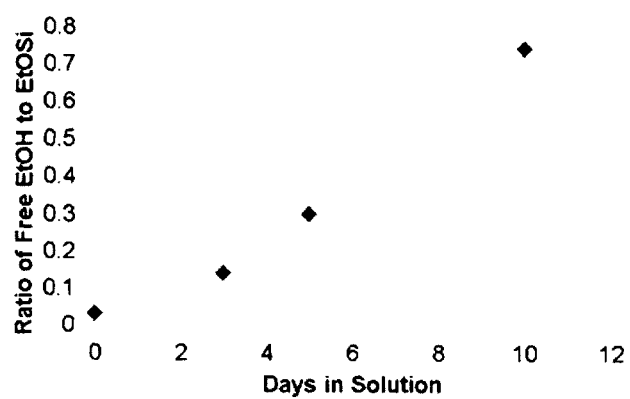
FIG. 2C shows the semi-quantitative analysis of the ratio of free EtOH to SiOEt groups after 3, 5, and 10 days.
Figure 3A:
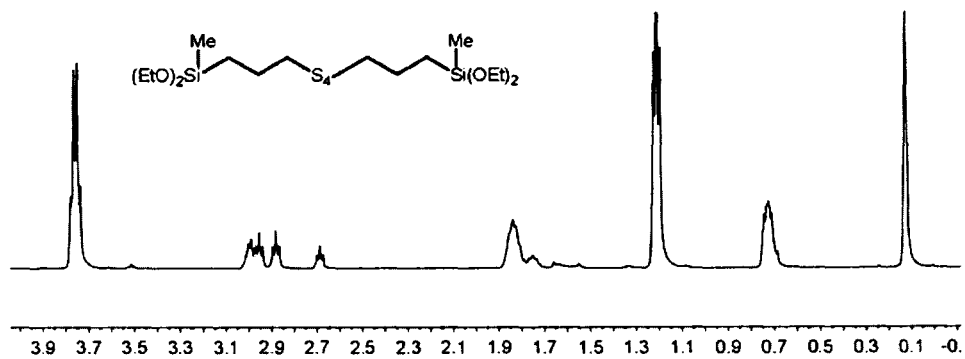
FIG. 3A shows the $^1$H NMR of BMDE silane fresh from the bottle under ambient conditions in $CDCl_3$.
Figure 3B:
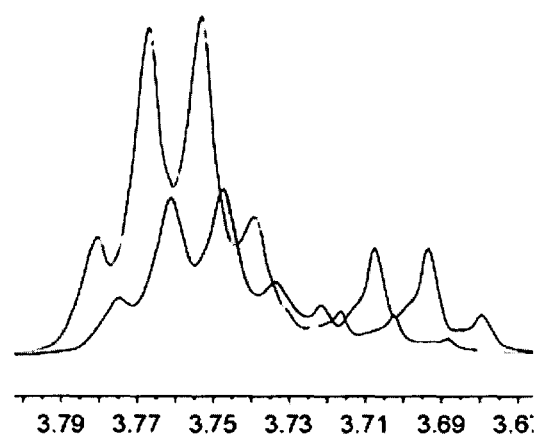
FIG. 3B shows decomposition as evidenced by the appearance of a new quartet at 3.72 ppm, assigned as free EtOH.
Figure 3C:
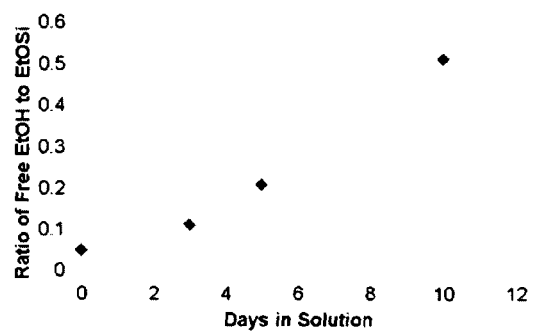
FIG. 3C shows the semi-quantitative analysis of the ratio of free EtOH to SiOEt groups after 3, 5, and 10 days.
Figure 4A:
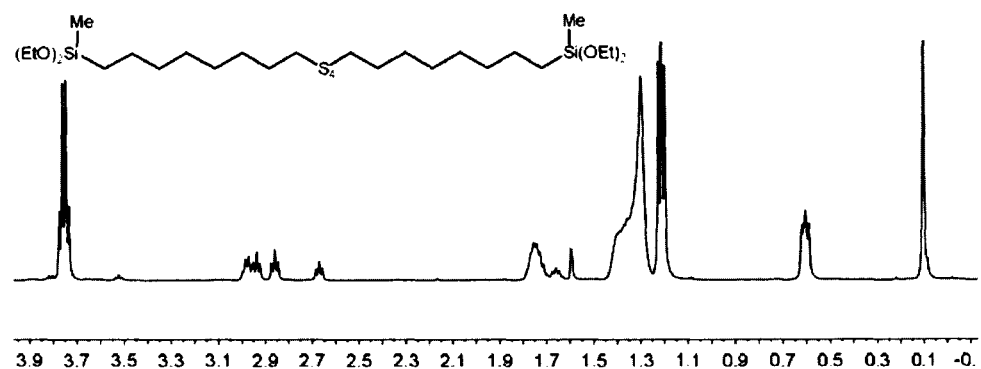
FIG. 4A shows the $^1$H NMR of BMDEO silane fresh from the bottle under ambient conditions in $CDCl_3$.
Figure 4B:
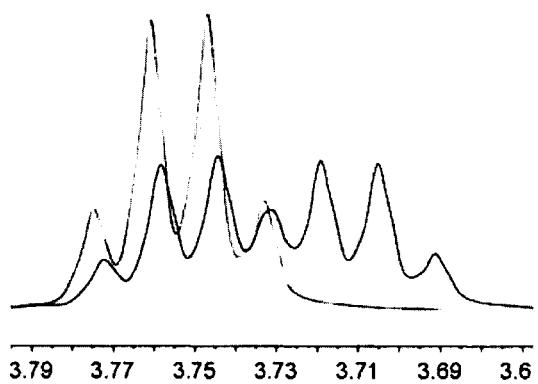
FIG. 4B shows decomposition as evidenced by the appearance of a new quartet at 3.72 ppm, assigned as free EtOH.
Figure 4C:
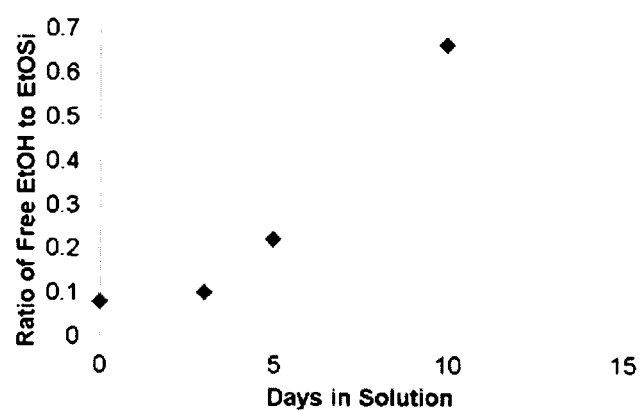
FIG. 4C shows the semi-quantitative analysis of the ratio of free EtOH to SiOEt groups after 3, 5, and 10 days.
Figure 5:
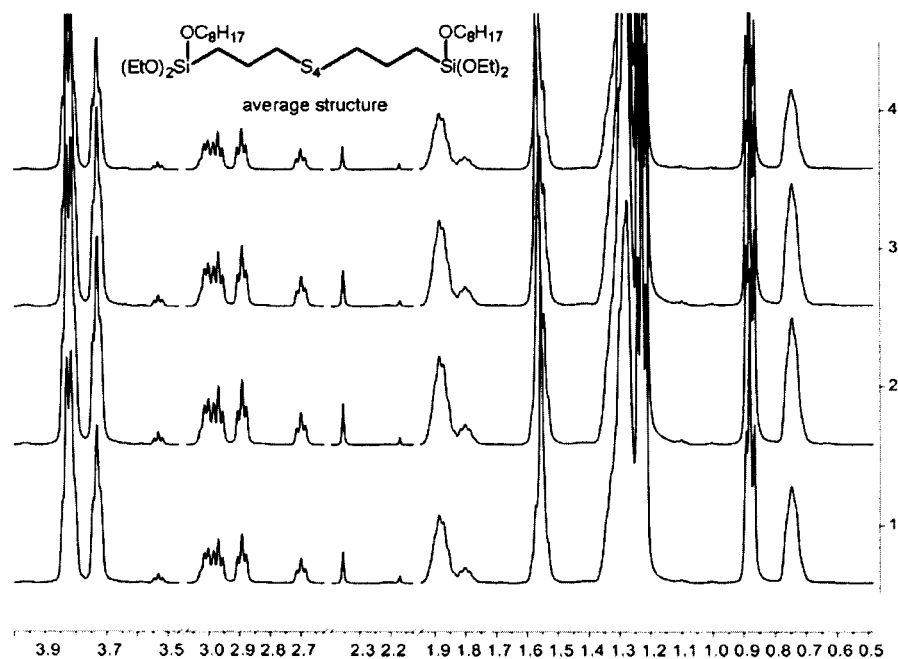
FIG. 5 shows the $^1$H NMR of BDEO silane fresh from the bottle and after 3, 5, and 27 days under ambient conditions in $CDCl_3$, showing no apparent decomposition.
Figure 6:
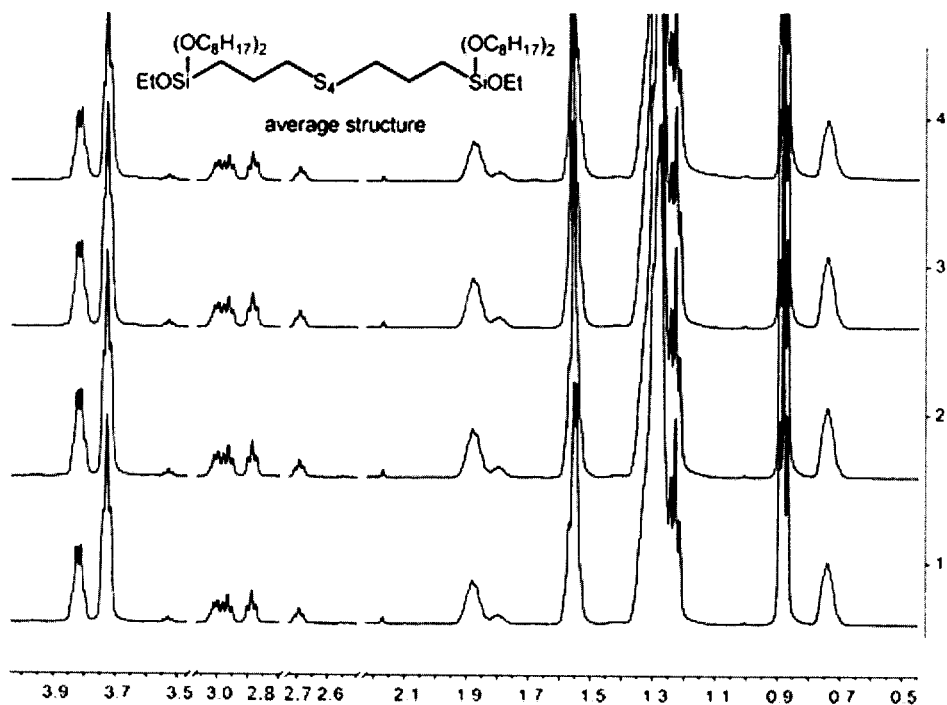
FIG. 6 shows the $^1$H NMR of BEDO silane fresh from the bottle and after 3, 5, and 27 days under ambient conditions in $CDCl_3$, showing no apparent decomposition.

The substitution pattern around the silicon atom in alkoxy silanes controls the rate of hydrolysis, and thus the relative stability of silane coupling agents. The structures included here featured three variations from the most common silane, TESPT (Table 12): replacement of the propyl linker with an octyl linker, replacement of one alkoxy group with a methyl group, and replacement of the ethoxy groups with octyloxy groups. FIG. 1A, FIG. 1B and FIG. 1C show the decomposition of TESPT, after less than 3 days the material already shows measurable decomposition, as evidenced by the appearance of free EtOH at 3.72 ppm. Decomposition continues over the course of 10 days eventually reaching ~25% free EtOH (as a fraction of total ethoxy content). Replacing the propyl linker between the silicon and the sulfur atoms with an octyl chain results in an approximate doubling of the decomposition rate, leading to ~45% free EtOH (FIG. 2A, FIG. 2B, and FIG. 2C). Exchange of one ethoxy group on the silicon atom for a methyl group slightly increases the rate of decomposition resulting in ~30% free silane (FIG. 3A, FIG. 3B, and FIG. 3C). Together these changes give compound BMDEO an intermediate decomposition rate falling approximately between that of BTEO and TESPT (FIG. 4A, FIG. 4B, and FIG. 4C). It should be noted here that these results are semi-quantitative, and do not include necessary replicates to allow us to distinguish subtle differences. Exchange of one (BDEO, FIG. 5) or two (BEDO, FIG. 6) of the ethoxy groups of TESPT for an octyloxy change has a much more dramatic effect: no observable decomposition over 27 days in solution. This observation is consistent with steric shielding of the silicon atom by the randomly coiled alkyl chain. BDEO and BEDO are prepared by alcoholysis of TESPT with octanol at different ratios, adding cost to the preparation of the silane; however the added stability could provide substantial value in added shelf stability for the final polymer additive formulation in Table 8.

The invention claimed is:

1. An elastomeric composition comprising, per 100 parts by weight of rubber (phr): about 100 phr of a diene elastomer; 0 to about 80 phr of processing oil; 0 to about 80 phr of a hydrocarbon resin; about 60 to about 140 phr of filler; a curative agent; and about 20 phr of a silane functionalized propylene-ethylene-diene terpolymer comprising from about 2 to about 40 wt % of ethylene and/or $C_4$-$C_{20}$ α-olefin derived units, and from about 0.5 to about 10 wt % of diene derived units;

wherein the silane functionalized propylene-ethylene-diene terpolymer is functionalized by a silane coupling agent selected from the group consisting of

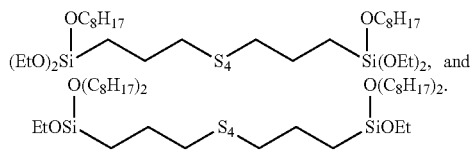

2. The elastomeric composition of claim 1, wherein the filler is a silica-based filler.

3. The elastomeric composition of claim 1, wherein the filler is a carbon black filler.

4. The elastomeric composition of claim 1, wherein the filler is blend of silica-based filler and a carbon black filler.

5. The elastomeric composition of claim 1, wherein the propylene-ethylene-diene terpolymer contains from 0.5 wt % to 10 wt % ethylidene norbornene based on the terpolymer.

6. The elastomeric composition of claim 1 wherein the propylene-ethylene-diene terpolymer contains from 2 wt % to 20 wt % ethylene based on the terpolymer.

7. The elastomeric composition of claim 1 wherein the propylene-ethylene-diene terpolymer contains 60 wt % to 95 wt % propylene based on the terpolymer.

8. The elastomeric composition of claim 1 wherein the melt flow rate (MFR) at 2.16 kg weight at 230° C. of the propylene-ethylene-diene terpolymer is from about 0.2 to about 10 g/10 min.

9. The elastomeric composition of claim 1 wherein the diene elastomer is a styrene-butadiene rubber, a functionalized diene rubber, a styrenic copolymer, a polybutadiene, natural rubber, a polyisoprene, a butadiene copolymer, an isoprene copolymer or blends thereof.

10. The elastomeric composition of claim 1, consisting of the diene elastomer; the processing oil; the hydrocarbon resin; the filler; the curative agent; and the silane functionalized propylene-ethylene-diene.

11. The elastomeric composition of claim 1, wherein $H^1$ NMR of the silane functionalized propylene-ethylene-diene terpolymer comprises no measurable decomposition within 27 days.

12. A tire tread composition comprising the elastomeric composition of claim 1.

13. The tire tread composition of claim 12, wherein the tire tread composition further comprises a second silane coupling agent.

14. A method of making the elastomeric composition of claim 1 comprising the steps of:
(a) blending the diene elastomer, the filler, the processing oil, the hydrocarbon resin, and the silane functionalized propylene-ethylene diene terpolymer to form a first component at a temperature in the range from about 110° C. to about 200° C.;
(b) blending the curative agent with the first component at a temperature in the range of about less than 110° C.; and
(c) recovering the elastomeric composition.

15. A method of balancing the wet traction performance and rolling resistance in a tire tread comprising the elastomeric composition of claim 1, the method comprising:
combining at least the filler, the diene elastomer, the hydrocarbon resin, the processing oil, and the curative agent with the silane functionalized propylene-ethylene-diene terpolymer to form the tire tread;
effecting a cure to form a tire tread; and
wherein the level of the silane functionalized propylene-ethylene-diene terpolymer relative to the filler, the diene elastomer, the hydrocarbon resin, the processing oil, and the curative agent, and the silane functionalized propylene-ethylene-diene terpolymer comonomer content, can be varied to improve the balance of wet traction and rolling resistance of the tire tread.

* * * * *